United States Patent
Howarth et al.

(10) Patent No.: US 9,838,803 B1
(45) Date of Patent: Dec. 5, 2017

(54) CARBON NANOTUBE UNDERWATER ACOUSTIC THERMOPHONE

(71) Applicants: Thomas R Howarth, Portsmouth, RI (US); Dehua Huang, Newport, RI (US)

(72) Inventors: Thomas R Howarth, Portsmouth, RI (US); Dehua Huang, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/273,817

(22) Filed: Sep. 23, 2016

(51) Int. Cl.
G01S 7/521 (2006.01)
H04R 23/00 (2006.01)

(52) U.S. Cl.
CPC ............ H04R 23/002 (2013.01); G01S 7/521 (2013.01)

(58) Field of Classification Search
CPC ............ H04R 23/002; H04R 2201/028; H04R 2205/021; G01S 7/521
See application file for complete search history.

(56) References Cited

U.S. PATENT DOCUMENTS

| | | |
|---|---|---|
| 6,798,122 B1 | 9/2004 | Howath |
| 8,199,938 B2 | 6/2012 | Jiang et al. |
| 8,254,209 B2 | 8/2012 | Yamanaka et al. |
| 8,259,966 B2 | 9/2012 | Jiang et al. |
| 8,300,854 B2 | 10/2012 | Jiang et al. |
| 8,406,450 B2 | 3/2013 | Jiang et al. |
| 8,440,958 B2 | 5/2013 | Bandyopadhyay |
| 8,452,031 B2 | 5/2013 | Jiang et al. |
| 8,457,331 B2 | 6/2013 | Liu |
| 8,494,187 B2 | 7/2013 | Jiang et al. |
| 8,537,640 B2 | 9/2013 | Jiang et al. |
| 8,553,912 B2 | 10/2013 | Wang et al. |
| 8,811,631 B2 | 8/2014 | Liu |
| 8,873,776 B2 | 10/2014 | Kim et al. |
| 8,958,579 B2 | 2/2015 | Jiang et al. |
| 2010/0054503 A1* | 3/2010 | Jiang ...................... G10K 15/04 381/164 |
| 2010/0172213 A1* | 7/2010 | Qian ..................... H04R 23/002 367/140 |
| 2010/0172214 A1* | 7/2010 | Qian ..................... H04R 23/002 367/140 |
| 2010/0172215 A1* | 7/2010 | Liu ....................... H04R 23/002 367/140 |
| 2010/0172216 A1* | 7/2010 | Liu ....................... H04R 23/002 367/140 |

(Continued)

*Primary Examiner* — Daniel Pihulic
(74) *Attorney, Agent, or Firm* — James M. Kasischke; Michael P. Stanley

(57) ABSTRACT

A carbon nanotube thermophone is provided. The thermophone includes high temperature rated shells as protective walls as the top and bottom housing of the thermophone with carbon nanotube sheets affixed between the shells. The shells act as acoustic windows that match the surrounding frequency and acoustic radiation medium. A high temperature rated sealant gasket is used to enclose the shells of the thermophone where gas holes are inserted for interior heavy gas filling. The acoustic resonant frequency is defined by the dimensions of the housing of the thermophone and the sound speed of the filled heavy gas. Each carbon nanotube sheet has an electrode at both ends. Multiple carbon nanotube sheets can electrically tune the impedance to match a driving amplifier impedance load.

6 Claims, 1 Drawing Sheet

(56) References Cited

U.S. PATENT DOCUMENTS

| | | | |
|---|---|---|---|
| 2010/0188933 A1* | 7/2010 | Qian | H04R 23/002 367/140 |
| 2010/0188934 A1* | 7/2010 | Qian | H04R 23/002 367/140 |
| 2010/0188935 A1* | 7/2010 | Qian | H04R 23/002 367/140 |
| 2010/0189296 A1* | 7/2010 | Qian | H04R 23/002 381/345 |
| 2010/0195849 A1* | 8/2010 | Qian | H04R 23/002 381/120 |
| 2012/0000293 A1* | 1/2012 | Baughman | H02N 1/006 73/861.08 |
| 2016/0037267 A1* | 2/2016 | Aliev | H04R 23/002 381/164 |

\* cited by examiner

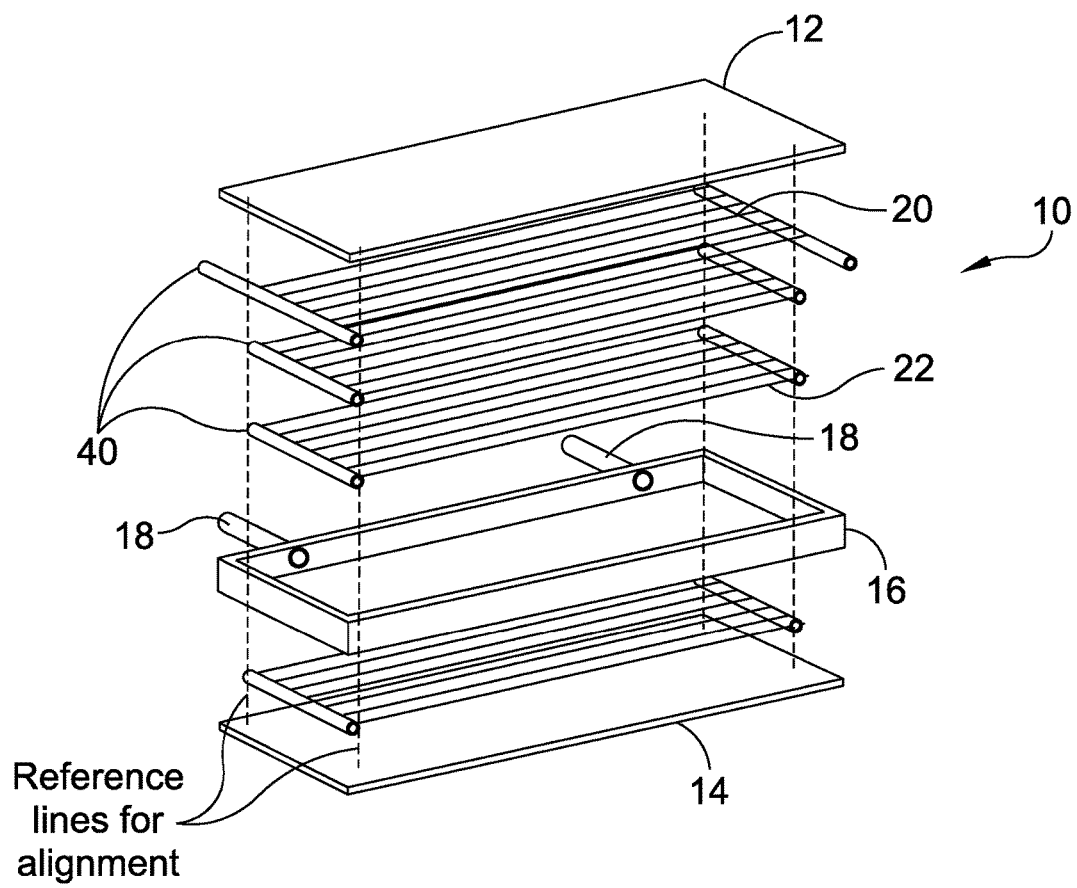

CARBON NANOTUBE UNDERWATER ACOUSTIC THERMOPHONE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

The present application relates to application Ser. No. 15/273,801; filed 23 Sep. 2016, entitled "UNDERWATER ACOUSTIC CARBON NANOTUBE THERMOPHONE" and application Ser. No. 15/270,166; filed 20Sep. 2016, "entitled "PASSIVE MODE CARBON NANOTUBE UNDERWATER ACOUSTIC TRANSDUCER".

BACKGROUND OF THE INVENTION (1) Field of the Invention

The present invention is an acoustically transparent carbon nanotube thermophone.

(2) Description of the Prior Art

Traditional acoustic transduction typically begins with the generation of electrical excitation pulsed through an amplifier into an electro-acoustic material (such as a piezoelectric ceramic, piezocomposite, or a magnetostrictive ferromagnetic compound). This electrical excitation creates a mechanical vibration that is then converted into an acoustic wave to produce sound. The lower the preferred transmitting frequency (and hence a longer acoustic detection range) desired; the larger the size of the conventional transducer that is required. Often, for acoustic projectors producing sound at frequencies below a few kHz; the electroacoustic device needs to be comparatively very large in order to produce long sound waves. The large size of the electroacoustic device can be a serious limitation for incorporating low-frequency, long-range detection sonars on autonomous underwater vehicles (AUVs).

When using comparatively smaller or thin conductors, alternating current is passed through the conductor. Following variations in current strength; periodic heating takes place in the conductor. This periodic heating produces temperature waves which are propagated into a surrounding liquid medium. The amplitude of the temperature waves fall off rapidly as a distance from the conductor increases. Because of the rapid variations of these temperature waves; the net effect is to produce a periodic rise in temperature in a portion of the gas/liquid medium near the conductor. Thermal expansion and contraction of this portion (or layer) of the medium determines the amplitude of the resulting sound waves.

Recently, there has been development of underwater acoustic carbon nanotube (CNT) yarn sheets capable of producing high acoustic output at low frequencies with broad bandwidth. An underwater acoustic transmitter is feasible in which the transmitter uses thermal means to heat CNT substrates and in which a low frequency acoustic projector is formed. The acoustic carbon nanotubes can act as transducers while having a comparatively small volumetric size. The principle transduction for this approach is through thermal acoustics as opposed to conventional underwater transducers that utilize electromechanical vibrations. This type of thermal acoustic producing device is known as a thermophone.

However, a problem with using the thermal acoustics of carbon nanotubes is that the nanotubes (unless encapsulated or housed) are quite fragile and are susceptible to disintegration especially if the nanotubes are touched or moved too quickly. A bare nanotube configuration also has a serious risk of damage when being transported and handled.

Another problem is using the CNT yarn sheets in a high power conventional wave operation in water. This type of use overheats the CNT sheets such that the housing encapsulation temperature may rise to an unacceptable level that can induce thermal damage in the housing. As such, when making a CNT thermophone, encapsulating materials need capabilities for high temperature and heat dissipation.

SUMMARY OF THE INVENTION

It is therefore a primary object and general purpose of the present invention to optimize an acoustic thermophone capable of converting heat into sound.

It is a further object of the present invention to provide a low frequency sound source in a comparatively thin transduction package.

It is a still further object of the present invention to provide a thermophone with an electrical input impedance of less than 100 Ohms such the impedance matches an output impedance of a power amplifier and so that there is no loss of energy during a conversion.

In order to attain the objects of the invention, a thermophone device of configured multiple carbon nanotube layers positioned in radiating housings with an interior gas fill is provided. Top and bottom shells are not only the protective walls of the thermal housing but also act as acoustic windows to match a desired operational frequency and acoustic radiation medium.

BRIEF DESCRIPTION OF THE DRAWINGS

Reference is made to the accompanying drawing in which is shown an illustrative embodiment of the invention, from which its novel features and advantages will be apparent, wherein corresponding reference characters indicate corresponding parts throughout the several views of the drawings and wherein the FIGURE depicts a multi-sheet carbon nanotube material substrate.

DETAILED DESCRIPTION OF THE INVENTION

In the FIGURE, a thermophone 10 of the present invention with multi-sheet carbon nanotube substrates is shown. The CNT thermophone 10 comprises mechanical, acoustical and electrical sections. The mechanical section includes a first ceramic shell 12 and a second ceramic shell 14, both of which are high temperature rated such as aluminum nitride (AlN) with a melting point of 2200 degrees Celsius. Ceramic shell thicknesses are based upon desired operational frequency requirements.

The first (top) ceramic shell 12 and the second (bottom) ceramic shell 14 serve not only as the protective walls of a housing of the carbon nanotube material thermophone 10 but also act as acoustic windows to match the frequency and acoustic radiation medium. If the second ceramic shell 14 is not used as a radiation surface; the shell can be made of a different thermal material (such as copper, iron or steel) to serve as a heat sink.

A high temperature rated sealant gasket 16 is used to enclose the thermal housing of the thermophone 10 where at least two gas holes 18 are available for interior heavy gas filling. The gasket 16 is preferably made of high-temperature rated rubber with a maximum temperature of 300 degrees Celsius or greater with an approximately one millimeter thickness. The heavy gas used is preferably Argon; however, SF6 gas or Xenon gas can be used with marginally improved thermoacoustic efficiency but at a significantly higher expense.

The acoustic resonant frequency is determined by the dimensions of the housing of the thermophone 10 and the speed of sound of the filled heavy gas. The active thermoacoustic transduction is by a first CNT sheet 20, a second CNT sheet 22 and a "N" layer of CNT sheets. The deciding factor on the number of CNT sheets is the number of parallel sheets determined to provide a matching electrical impedance with a power amplifier (not shown) so that there is no loss of resistive energy in the transformation between the amplifier and the thermophone 10. The number of layers "N" is determined by both the carbon nanotube electrical impedance of each layer as well as the wiring in series or in parallel of each of the layers of CNT sheets. Each CNT sheet has an electrode 40 at both ends.

If sound energy only radiates from the top of the thermophone 10, the top shell 12 serves as an acoustic window. The acoustic impedance (defined as the product of material density and sound speed) of the top shell 12 should match the radiation medium for higher efficiency. This radiation matching can be realized using plates that are significantly thinner than the operating acoustic wavelengths. In this configuration, the bottom shell 14 can be designed as a heat sink by a different type of high temperature rated compound, such as copper material. An example of a heat sink is a heavy metal such as iron or steel or even a heavy ceramic block.

Unlike conventional vibration-based transduction principles, the CNT thermophone 10 is based on a thermal acoustic principle where electric energy is converted to a heat format, which in turn is linked to acoustic energy per the ideal gas law which relates pressure and volume to the number of moles times the ideal gas constant and absolute temperature of the gas (PV=nRT) where P, V, n, R and T are the pressure of the gas, the amount of the gas in moles, the ideal (or universal) gas constant, and the gas temperature.

One of the implications is that when the CNT thermophone 10 is driven at a frequency; the acoustic field generated by the CNT thermophone occurs at twice the frequency. In fact, only noise is observed at the primary driving frequency while a full acoustic output occurs at twice the frequency.

Advantages and features of the transducer of the CNT thermophone 10 are that the thermophone comprises a thin and lightweight package. Also, the resonant frequency is defined by the dimensions of the housing of the thermophone 10 where the dimensions of the support structure give rise to specific resonances related to these dimensions (eg, the structural resonances of the plates). The housing can comprise multiple CNT sheets where the exact number of sheets is determined by the cross-sectional area and specific resistive load matching to the power amplifier that is desired.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A thermophone comprising:
   an acoustically transparent first shell in which said first shell is rectangular with a thickness between a first plane and a second plane;
   an acoustically transparent second shell in which said second shell is rectangular with a thickness between a first plane and a second plane wherein said second shell has the same rectangular size as said first shell;
   a plurality of carbon nanotube sheets with each of said carbon nanotube sheets have a first plane and a second plane such that the planes of each nanotube sheet align with the planes of said first shell and said second shell with said nanotube sheets positioned between said shells;
   a plurality of electrodes, with at least two of said electrodes electrically connected to each of said carbon nanotube sheets with a first of said electrodes at one end of each said nanotube sheets and a second of said electrodes at another end of each of said nanotube sheets;
   a sealant gasket rated for at least 300 degrees Celsius and having a thickness of one millimeter with said sealant gasket surrounding said layers of carbon nanotubes and positioned between said first and second shell to form a thermal housing of said thermophone; and
   at least two gas apertures within said sealant gasket wherein said gas apertures are capable of heavy gas filling said thermophone.

2. The thermophone in accordance with claim 1, wherein said first shell and said second shell are alumina with a high temperature rating of at least 1000 Celsius degrees with each of said shells having a thickness of less than one millimeter.

3. The thermophone in accordance with claim 2, wherein said first shell and said second shell act as acoustic windows to match the frequency and acoustic radiation medium.

4. The thermophone in accordance with claim 3, wherein an impedance is capable of being matched to a power amplifier output impedance with the impedance of said thermophone based on a number of carbon nanotube sheets.

5. The thermophone in accordance with claim 3, wherein said second shell is copper and capable of operating as a heat sink.

6. The thermophone in accordance with claim 4, wherein said second shell is copper and capable of operating as a heat sink.

* * * * *